(12) United States Patent
Pan et al.

(10) Patent No.: US 11,827,087 B2
(45) Date of Patent: Nov. 28, 2023

(54) BATTERY BOX AND BATTERY PACK, VEHICLE

(71) Applicant: CALB Co., Ltd., Jiangsu (CN)

(72) Inventors: Fangfang Pan, Changzhou (CN); Junshan Guan, Luoyang (CN); Tiebo Ma, Luoyang (CN); Tinglu Yan, Changzhou (CN); Yongjie Zhang, Luoyang (CN); Qixin Guo, Luoyang (CN)

(73) Assignee: CALB Co., Ltd., Jiangsu (CN)

( * ) Notice: Subject to any disclaimer, the term of this patent is extended or adjusted under 35 U.S.C. 154(b) by 140 days.

(21) Appl. No.: 17/384,821

(22) Filed: Jul. 26, 2021

(65) Prior Publication Data

US 2022/0363118 A1 Nov. 17, 2022

(30) Foreign Application Priority Data

May 14, 2021 (CN) .......................... 202110529729.8

(51) Int. Cl.
  *B60K 1/04* (2019.01)
  *H01M 10/613* (2014.01)
  *H01M 10/625* (2014.01)
  *H01M 10/6554* (2014.01)
  *B60L 50/64* (2019.01)
  *H01M 50/209* (2021.01)
  *H01M 50/271* (2021.01)

(52) U.S. Cl.
  CPC ................ *B60K 1/04* (2013.01); *B60L 50/64* (2019.02); *H01M 10/613* (2015.04); *H01M 10/625* (2015.04); *H01M 10/6554* (2015.04); *H01M 50/209* (2021.01); *H01M 50/271* (2021.01); *H01M 2220/20* (2013.01)

(58) Field of Classification Search
  CPC ........ B60K 1/04; B60L 50/64; H01M 10/613; H01M 10/6554; H01M 50/209; H01M 50/271; H01M 50/242; H01M 2220/20
  See application file for complete search history.

(56) References Cited

U.S. PATENT DOCUMENTS 10,938,007 B2 * 3/2021 Wesche ............... H01M 50/242
2022/0006151 A1 * 1/2022 Foran ..................... B60K 1/04

FOREIGN PATENT DOCUMENTS

| CN | 212625888 | 2/2021 |
| EP | 3923366 | 12/2021 |
| WO | 2020162123 | 8/2020 |

OTHER PUBLICATIONS

"Search Report of Europe Counterpart Application", dated Feb. 1, 2022, p. 1-p. 8.

* cited by examiner

*Primary Examiner* — Jason D Shanske
*Assistant Examiner* — James J Triggs
(74) *Attorney, Agent, or Firm* — JCIP GLOBAL INC.

(57) ABSTRACT

The disclosure relates to the technical field of batteries, in particular to a battery box, a battery pack, and a vehicle. The battery box includes a beam, a box cover, and a buffer member. The buffer member is disposed between the beam and the box cover and the buffer member is connected to the beam.

19 Claims, 4 Drawing Sheets

BATTERY BOX AND BATTERY PACK, VEHICLE

CROSS-REFERENCE TO RELATED APPLICATION

This application claims the priority of China patent application serial no. 202110529729.8, filed on May 14, 2021. The entirety of the above-mentioned patent application is hereby incorporated by reference herein and made a part of this specification.

BACKGROUND OF THE INVENTION

Field of the Invention

The disclosure relates to the technical field of batteries, and in particular, to a battery box, a battery pack, and a vehicle.

Description of Related Art

With the development and progress of technology, the application of electric vehicles is becoming more and more extensive. The battery is one of the important elements in the electric vehicle. Currently, the battery is usually disposed in a battery box, and the battery box is mounted in the corresponding position of the electric vehicle. The battery box includes a box body and a box cover, etc., and the box cover may be connected to the box body. During the operation of electric vehicles, there is often a larger vibration. The vibration of the vehicle readily causes the box cover to vibrate. The vibration of the box cover affects the structure in the battery box, such as batteries, circuits, etc., and thus causes safety issues.

It should be mentioned that, the information disclosed in the technical background section above is only used to enhance the understanding of the background of the disclosure, and therefore may include information that does not constitute the prior art known to those having ordinary skill in the art.

SUMMARY OF THE INVENTION

According to the first aspect of the disclosure, a battery box is provided. The battery box includes:
  a beam;
  a box cover;
  a buffer member, wherein the buffer member is disposed between the beam and the box cover and connected to the beam.

In the battery box provided by an embodiment of the disclosure, the buffer member is disposed between the beam and the box cover, and the buffer member is connected to the beam.

According to the second aspect of the disclosure, a battery pack is provided. The battery pack includes:
  the above battery box; and
  a battery assembly, wherein the battery assembly is disposed in the battery box.

The battery pack provided by an embodiment of the disclosure includes the battery box. In the battery box, the buffer member is disposed between the beam and the box cover, and the buffer member is connected to the beam.

According to the third aspect of the disclosure, a vehicle is provided. The vehicle includes the above battery pack.

The vehicle provided by an embodiment of the disclosure includes the battery box. In the battery box, the buffer member is disposed between the beam and the box cover, and the buffer member is connected to the beam.

It should be understood that the above general description and the following detailed description are only exemplary and explanatory, and may not limit the disclosure.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An object of the disclosure is to provide a battery box, a battery pack, and a vehicle, so as to reduce the vibration of the box cover in the battery box at least to a certain extent.

Figure 1:
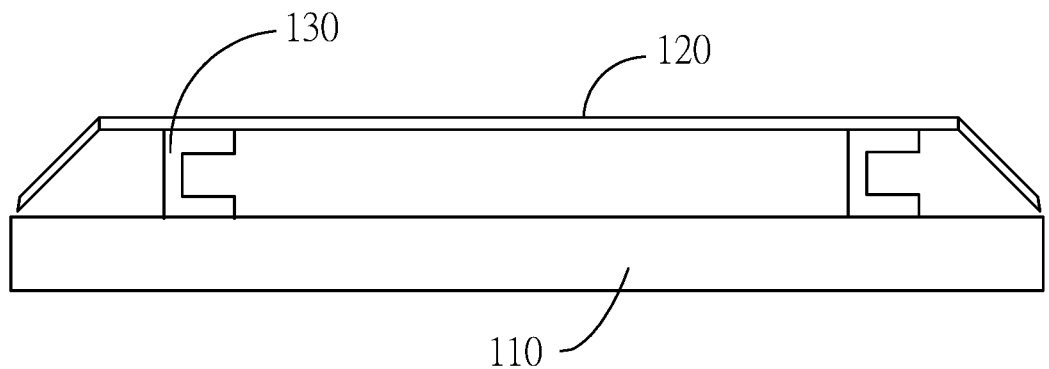
FIG. 1 is a schematic diagram of a first battery box provided by an exemplary embodiment of the disclosure.

An exemplary embodiment of the disclosure first provides a battery box. As shown in FIG. 1, the battery box includes a beam 110, a box cover 120, and buffer members 130. The buffer members 130 are disposed between the beam 110 and the box cover 120 and are connected to the beam 110.

In the battery box provided by an embodiment of the disclosure, the box cover 120 is disposed at a side of the beam 110 away from the bottom plate, and the buffer members 130 are connected to the beam 110. The buffer members 130 between the beam 110 and the box cover 120 may buffer the vibration of the box cover 120 to improve safety, and solve the issue that excessive vibration of the box cover 120 damages the box cover 120 to improve the service life of the box cover 120. Potential damage to the batteries from the box cover 120 during vibration is also avoided, thus improving the service life of the batteries.

Hereinafter, each portion of the battery box provided by the embodiments of the disclosure is described in detail.

Figure 2:
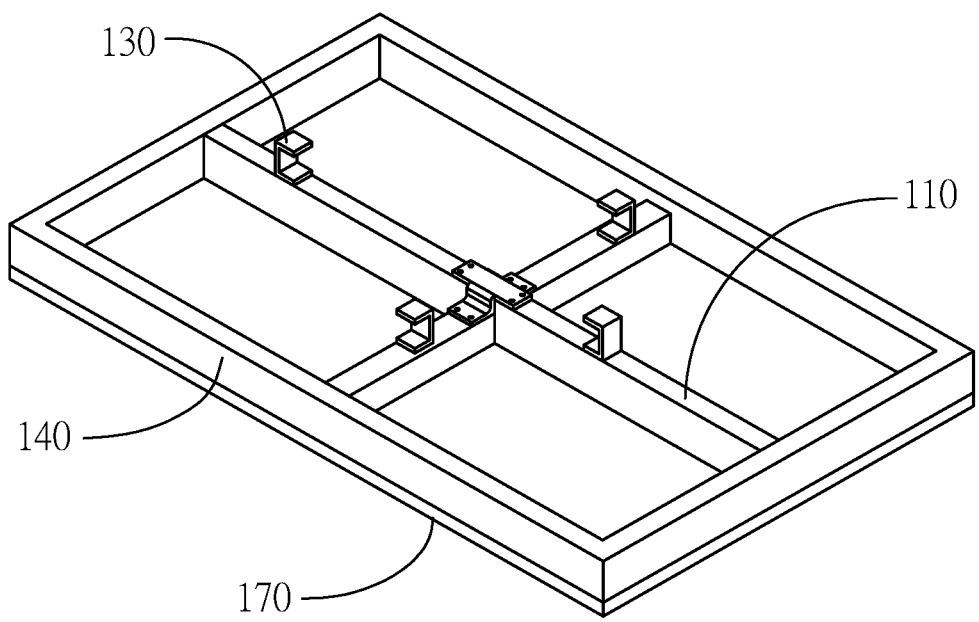
FIG. 2 is a schematic diagram of a second battery box provided by an exemplary embodiment of the disclosure.

As shown in FIG. 2, in an embodiment of the disclosure, the beam 110 may be disposed at a bottom plate 170, and the bottom plate 170 may be a flat plate structure or a flat plate-like structure. For example, the bottom plate 170 may be a stainless-steel plate, an aluminum alloy plate, etc. An accommodating area is disposed on the bottom plate 170, and the accommodating area is configured to place batteries or battery assemblies. The orthographic projection of the batteries or the battery assemblies on the bottom plate is located in the accommodating area, and the batteries or the battery assemblies may be directly placed in the accommodating area, or other devices may also be disposed between the batteries or the battery assemblies and the bottom plate, such as a cooling device, etc., and the embodiments of the disclosure are not specifically limited in this regard.

Figure 3:
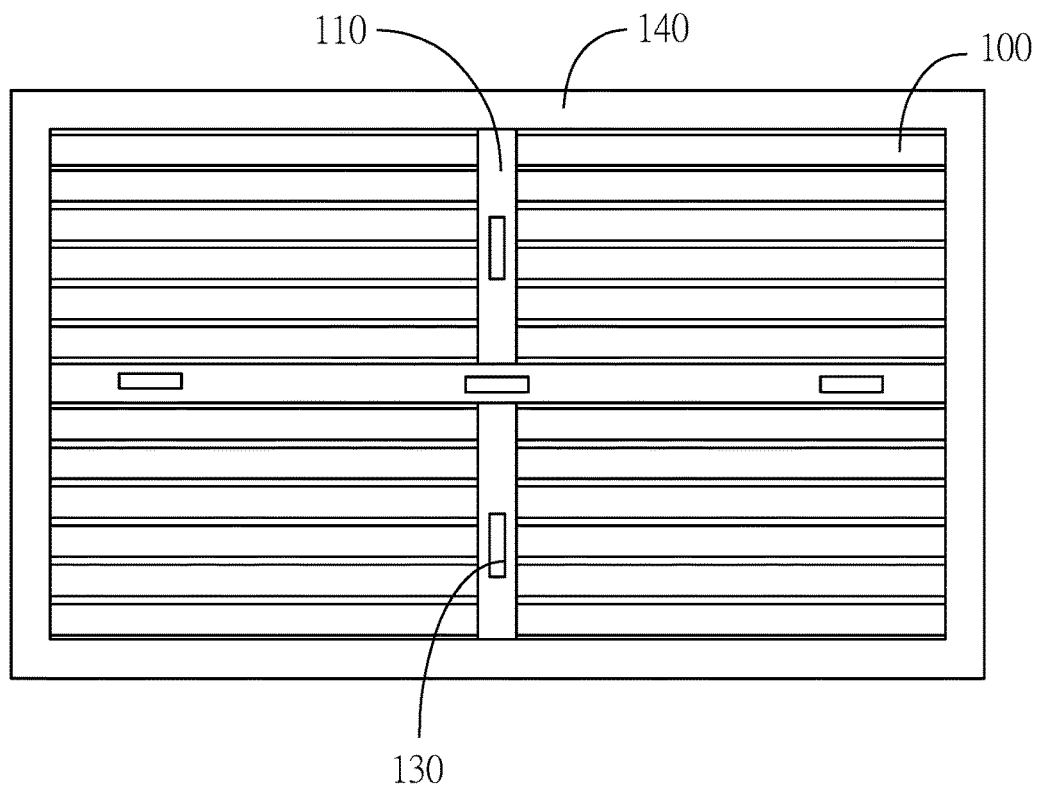
FIG. 3 is a schematic diagram of a battery pack provided by an exemplary embodiment of the disclosure.

As shown in FIG. 3, the bottom plate 170 may be provided with a frame 140 and the beam 110 thereon. The frame 140 includes a plurality of frame beams. The frame beams are configured to form an accommodating portion for placing batteries 100. The beam 110 is disposed at the accommodating portion. The beam 110 divides the accommodating portion into a plurality of battery compartments, each of the battery compartments is provided with a battery pack therein, and the battery pack has a plurality of batteries 100. When the batteries 100 are mounted in the battery compartments, the frame 140 and/or the beam 110 are connected to the batteries 100 to withstand at least a portion of the weight of the batteries 100.

In an embodiment of the disclosure, the batteries 100 are directly placed in the battery compartments, and there is no need to package a plurality of batteries into battery modules and mount them in the battery compartments. The batteries may be directly in contact with the bottom plate, the frame 140, and the beam 110. Or the batteries are connected to the frame 140 and the beam 110 by a connecting method such as a connecting adhesive. The beam 110 and the frame 140 withstand at least a portion of the weight of the batteries.

The batteries are placed directly in the battery compartments, thereby increasing the number of batteries in the battery compartments, and thereby increasing the energy density of the battery pack. Since the batteries are directly mounted at the battery compartments, the box cover 120 may indirectly be in contact with the batteries during the vibration process, thus causing the batteries to be damaged. The box cover 120 and the beam 110 are connected by the buffer members 130, thus preventing the box cover 120 from damaging the batteries during vibration, and at the same time preventing the box cover 120 from being damaged. Further, the vibration of the box cover 120 may drive the box to vibrate, thus facilitating the mixing of electrolytes in the batteries, and thereby facilitating the reaction of the batteries.

The accommodating area on the bottom plate may be a rectangular structure, the frame 140 may include four frame beams, and the four frame beams are connected end to end to form a frame. For example, the battery pack may include a first frame beam, a second frame beam, a third frame beam, and a fourth frame beam. The first frame beam, the second frame beam, the third frame beam, and the fourth frame beam are connected end to end and form a frame by welding.

The beam 110 may be disposed in the frame. The beam 110 may include a first beam (a cross beam) and a second beam (vertical beam), and the first beam and the second beam are intersected. For example, the first beam and the second beam are vertically disposed.

In particular, the battery box may include one first beam and one second beam, the first beam and the first frame beam are parallel, and the second beam and the second frame beam are parallel. The first beam and the second beam divide the accommodating area into four battery compartments, and the batteries or the battery assemblies are respectively provided in the four battery compartments. Of course, in practical applications, the number of the first beam and the second beam may also be a plurality, and the embodiments of the disclosure are not limited thereto.

The beam 110 and the bottom plate may be connected by welding, and the frame beams and the bottom plate may be connected by welding. The bottom surface of the beam 110 is in contact with the top surface of the bottom plate, the bottom surface of the beam 110 is a flat surface, and the top surface of the bottom plate is a flat surface. Therefore, fillet welding may be performed at two sides of the beam 110 to connect the beam 110 and the bottom plate. The bottom surface of the frame beams is in contact with the top surface of the bottom plate, the bottom surface of the frame beams is a flat surface, and the top surface of the bottom plate is a flat surface. Therefore, fillet welding may be performed at the outside and inside of the frame beams to connect the frame beams and the bottom plate.

Moreover, in order to improve the connection strength of the beam 110 and the bottom plate, an adhesive containing groove may be disposed on the bottom plate and/or the beam 110, and a connecting adhesive layer may be disposed in the adhesive containing groove to connect the bottom plate and the beam 110. The adhesive containing groove may be disposed at the beam 110, or the adhesive containing groove may be disposed at the bottom plate, or the adhesive containing groove may be disposed on both the bottom plate and the beam 110. An adhesive injection channel may be disposed on the beam 110 or the bottom plate. The adhesive injection channel is configured to communicate with the outside after the beam 110 and the bottom plate are connected. The adhesive injection channel is connected to the adhesive containing groove. The connecting adhesive layer is disposed in the adhesive containing groove to glue the bottom plate to the beam 110.

The buffer members 130 are disposed on the beam 110, and the buffer members 130 are located at a side of the inner beam 110 away from the bottom plate. Alternatively, both the beam 110 and the frame beams may be provided with the buffer members 130, which is not specifically limited in the embodiments of the disclosure.

For example, a first beam and a second beam are disposed in the frame 140 formed by the frame beams, and the first beam and the second beam are vertically disposed. A plurality of buffer members 130 are disposed on the first beam, and the plurality of buffer members 130 may be evenly distributed on the first beam. A plurality of buffer members 130 are disposed on the second beam, and the plurality of buffer members 130 are evenly distributed at the second beam.

The buffer members 130 may be connected to the beam 110. At this time, the end of the buffer members 130 away from the beam 110 may provide buffer to the box cover 120 when the box cover 120 approaches the beam 110. Or two ends of the buffer members 130 may be connected to the beam 110 and the box cover 120 respectively.

As an example, the first end of the buffer members 130 is connected to a side of the beam 110 close to the box cover 120 to facilitate the connection of the buffer members 130 and the beam 110 and avoid affecting other structures in the battery box. The second end of the buffer members 130 is connected to a side of the box cover 120 close to the beam 110. The buffer members 130 are connected to the beam 110 and the box cover 120 at the same time, and the buffer effect is better, and the buffer members 130 are connected to a side of the box cover 120 close to the beam 110 to facilitate the connection of the buffer members 130 and the box cover 120.

In particular, the buffer members 130 and the beam 110 may be connected by one or a plurality of connecting methods of bolting, riveting, welding, and gluing. For example, the buffer members 130 and the beam 110 may be connected by a combination of bolting and gluing; or the buffer members 130 and the beam 110 may be connected by a combination of riveting and gluing; or the buffer members 130 and the beam 110 may be connected by a combination of welding and gluing.

When the buffer members 130 and the beam 110 are connected by adhesive, an adhesive containing groove may be disposed on a surface of the buffer members 130 close to the beam 110, wherein the adhesive containing groove is filled with a connecting adhesive, and the buffer members 130 and the beam 110 are bonded by the connecting adhesive.

When the buffer members 130 and the beam 110 are also connected by a bolt, a bolt hole needs to be disposed on the buffer members 130, and at this time, the adhesive containing groove and the bolt hole are not intersected. That is, the extension path of the adhesive container groove needs to avoid the bolt hole. Or, when the buffer members 130 and the beam 110 are also connected by welding, a welding area may be disposed on the edge of the buffer members 130, and the adhesive containing groove is disposed between the welding areas at two sides of the buffer members 130.

One or a plurality of connecting areas may be disposed on a side of the box cover 120 close to the bottom plate, and the connecting areas are configured to be connected to the buffer members 130. The buffer members 130 and the box cover 120 may be connected by one or a plurality of connecting methods of bolting, riveting, welding, and gluing. For example, the buffer members 130 and the box cover 120 may be connected by a combination of bolting and gluing; or the buffer members 130 and the box cover 120 may be connected by a combination of riveting and gluing; or the buffer members 130 and the box cover 120 may be connected by a combination of welding and gluing.

When the buffer members 130 and the box cover 120 are connected by gluing, an adhesive containing groove may be disposed on a surface of the buffer members 130 close to the box cover 120, wherein the adhesive containing groove is filled with a connecting adhesive, and the buffer members 130 and the box cover 120 are bonded by the connecting adhesive.

In particular, when the buffer members 130 and the box cover 120 are also connected by a bolt, a bolt hole needs to be disposed on the buffer members 130, and at this time, the adhesive containing groove and the bolt hole are not intersected. That is, the extension path of the adhesive container groove needs to avoid the bolt hole. Or, when the buffer members 130 and the box cover 120 are also connected by welding, a welding area may be disposed on the edge of the buffer members 130, and the adhesive containing groove is disposed between the welding areas at two sides of the buffer members 130.

Figure 4:
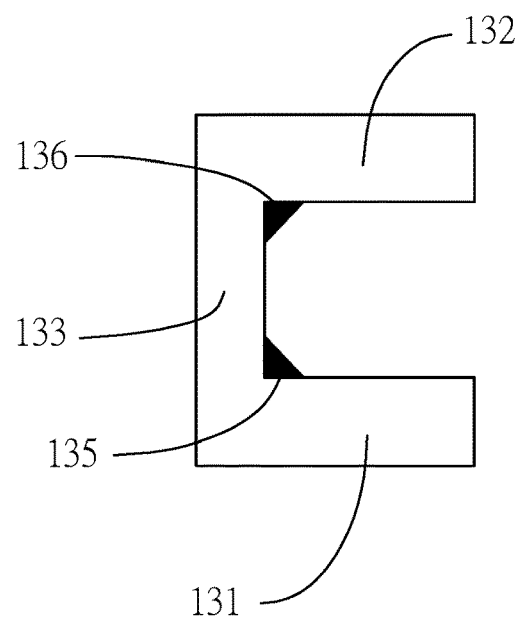
FIG. 4 is a schematic diagram of a buffer member provided by an exemplary embodiment of the disclosure.

In a feasible embodiment of the disclosure, as shown in FIG. 4, the buffer members 130 include: a first connecting portion 131, a second connecting portion 132, and a buffer portion 133. The first connecting portion 131 is configured to be connected to the beam 110; the second connecting portion 132 is configured to be connected to the box cover 120; an end of the buffer portion 133 is connected to the first connecting portion 131, and another end of the buffer portion 133 is connected to the second connecting portion 132.

In particular, a surface of the first connecting portion 131 close to the beam 110 may be a flat surface, and the flat surface is in contact with the top surface of the beam 110. The first connecting portion 131 and the beam 110 may be connected by a connecting method such as welding, bolting, riveting, or gluing.

A surface of the second connecting portion 132 close to the box cover 120 may be a flat surface, and the flat surface is in contact with the top surface of the beam 110. The first connecting portion 131 and the beam 110 may be connected by a connecting method such as welding, bolting, riveting, or gluing.

An end of the buffer portion 133 is connected to the first connecting portion 131, and another end of the buffer portion 133 is connected to the second connecting portion 132. The buffer portion 133 is configured to provide a buffer when the box cover 120 is vibrated, so as to avoid excessive vibration of the box cover 120. For example, the buffer portion 133 may have elasticity. When the force applied to the buffer members 130 by the box cover 120 is greater than a preset threshold, the buffer portion 133 may be elastically deformed, so as to buffer the vibration of the box cover 120.

The first connecting portion 131, the second connecting portion 132, and the buffer portion 133 in the buffer members 130 may be an integrated structure. For example, the first connecting portion 131, the second connecting portion 132, and the buffer portion 133 in the buffer members 130 may be integrally formed by casting or machining. Alternatively, the first connecting portion 131, the second connecting portion 132, and the buffer portion 133 in the buffer members 130 may be separate structures. For example, the buffer portion 133 and the first connecting portion 131 and the second connecting portion 132 may be connected by welding, respectively, or the buffer portion 133 and the first connecting portion 131 and the second connecting portion 132 may be connected by riveting, respectively, or the buffer portion 133 and the first connecting portion 131 and the second connecting portion 132 may be connected by a bolt, respectively. Of course, in practical applications, the buffer portion 133 and the first connecting portion 131 and the second connecting portion 132 may also be connected in other ways, and the embodiments of the disclosure are not limited thereto.

The materials of the first connecting portion 131, the second connecting portion 132, and the buffer portion 133 may be the same. For example, the materials of the first connecting portion 131, the second connecting portion 132, and the buffer portion 133 may be stainless steel, aluminum alloy, etc. When the materials of the first connecting portion 131, the second connecting portion 132, and the buffer portion 133 are the same, and the first connecting portion 131, the second connecting portion 132, and the buffer portion 133 are a flat plate structure, the thickness of the first connecting portion 131 is greater than the thickness of the buffer portion 133, and the thickness of the second connecting portion 132 is greater than the thickness of the buffer portion 133. The large thickness of the first connecting portion 131 and the second connecting portion 132 may ensure the connection strength of the buffer members 130 and the beam 110 and the buffer portion 133 and the box cover 120. The small thickness of the buffer portion 133 may ensure that the stiffness of the buffer portion 133 is within the preset required range, so that the buffer portion 133 may be elastically deformed when the box is vibrated.

Alternatively, the materials of the first connecting portion 131, the second connecting portion 132, and the buffer portion 133 are different, and the stiffness of the first connecting portion 131 and the second connecting portion 132 is greater than the stiffness of the buffer portion 133. The large stiffness of the first connecting portion 131 and the second connecting portion 132 may ensure the stability of the connection of the beam 110 and the buffer members 130 and the buffer members 130 and the box cover 120, and the small stiffness of the buffer portion 133 may ensure that the stiffness of the buffer portion 133 is within the preset required range, so that the buffer portion 133 may be elastically deformed when the box is vibrated. On this basis, when the first connecting portion 131, the second connecting portion 132, and the buffer portion 133 have a flat plate structure, the thicknesses of the first connecting portion 131, the second connecting portion 132, and the buffer portion 133 may be the same. The first connecting portion 131, the second connecting portion 132, and the buffer portion 133 have the same thickness to facilitate manufacture.

In an embodiment of the disclosure, the buffer members 130 may be, but not limited to, an I-shape, a Z-shape, an L-shape, and the like.

The extending direction of the first connecting portion 131 is perpendicular to the extending direction of the buffer portion 133, the extending direction of the second connecting portion 132 is consistent with the extending direction of the first connecting portion 131, the structure is simple, and the buffering effect is good. As an example, the buffer members formed by the first connecting portion 131, the second connecting portion 132, and the buffer portion 133 are C-shaped. The buffer members 130 are C-shaped members having a simple structure, are easy to manufacture, and have a good buffer effect.

It should be mentioned that, in an embodiment of the disclosure, the extending direction of the first connecting portion 131 and the extending direction of the buffer portion 133 are disposed perpendicularly. That is, the extending direction of the first connecting portion 131 and the extending direction of the buffer portion 133 are disposed perpendicularly within the tolerance range allowed by the process. The included angle between the extending direction of the first connecting portion 131 and the extending direction of the buffer portion 133 is a right angle, or the acute angle between the extending direction of the first connecting portion 131 and the extending direction of the buffer portion 133 is greater than a predetermined angle threshold. For example, the acute angle between the extending direction of the first connecting portion 131 and the extending direction of the buffer portion 133 is greater than 89 degrees, 88 degrees, 87 degrees, etc. The extending direction of the second connecting portion 132 is consistent with the extending direction of the first connecting portion 131, meaning that the first connecting portion 131 and the second connecting portion 132 are located at a side of the buffer portion 133, and the first connecting portion 131 and the second connecting portion 132 are disposed in parallel. The parallel arrangement of the first connecting portion 131 and the second connecting portion 132 means that the extending direction of the first connecting portion 131 and the extending direction of the second connecting portion 132 are parallel within the tolerance range of the process. The acute angle between the extending direction of the first connecting portion 131 and the extending direction of the second connecting portion 132 is smaller than a preset threshold. For example, the acute angle between the extending direction of the first connecting portion 131 and the extending direction of the second connecting portion 132 is less than 3 degrees, 2 degrees, 1 degree, etc.

The buffer members 130 may be directly connected to the box cover 120 or the buffer members 130 may be indirectly connected to the box cover 120. The buffer members 130 and the box cover 120 may be directly connected by one or a plurality of connecting methods of bolting, riveting, welding, and gluing.

Alternatively, a cold plate may be disposed at a side of the box cover 120 close to the bottom plate, the cold plate is connected to the box cover 120, and the buffer members 130 are connected to the cold plate. The cold plate and the box cover 120 may be connected by one or a plurality of methods of welding, bolting, riveting, and gluing. The buffer members 130 and the cold plate may be connected by one or a plurality of connecting methods of welding, bolting, riveting, and gluing.

For example, a mounting area is disposed on the box cover 120, and the cold plate is mounted at the mounting area. The mounting area may be a pit on the box cover 120, and the cold plate is disposed inside the pit. The second connecting portion 132 is connected to the cold plate, and the second connecting portion 132 and the cold plate may be connected by one or a plurality of methods of welding, bolting, riveting, and gluing.

Alternatively, the box cover 120 may be integrated with a cold plate. For example, a cooling liquid channel is disposed at a side of the box cover 120 close to the beam 110, and the batteries are cooled by a cooling liquid in the cooling liquid channel. Alternatively, the cooling liquid channel may also be disposed inside the box cover, which is not specifically limited in the embodiments of the disclosure.

In an embodiment of the disclosure, the buffer members 130 further include a first reinforcement portion 135 and a second reinforcement portion 136, and the first reinforcement portion 135 is connected to the first connecting portion 131 and the buffer portion 133, respectively; and the second reinforcement portion 136 is connected to the second connecting portion 132 and the buffer portion 133, respectively. The first reinforcement portion 135 is configured to improve the connection strength of the first connecting portion 131 and the buffer portion 133, and the second reinforcement portion 136 is configured to improve the connection strength of the first connecting portion 131 and the buffer portion 133.

In particular, the first reinforcement portion 135 may be a first reinforcement rib, and the first reinforcement rib is disposed at a portion where the first connecting portion 131 and the buffer portion 133 are connected. The second reinforcement portion 136 may be a second reinforcement rib, and the second reinforcement rib is disposed at a portion where the second connecting portion 132 and the buffer portion 133 are connected.

Figure 5:
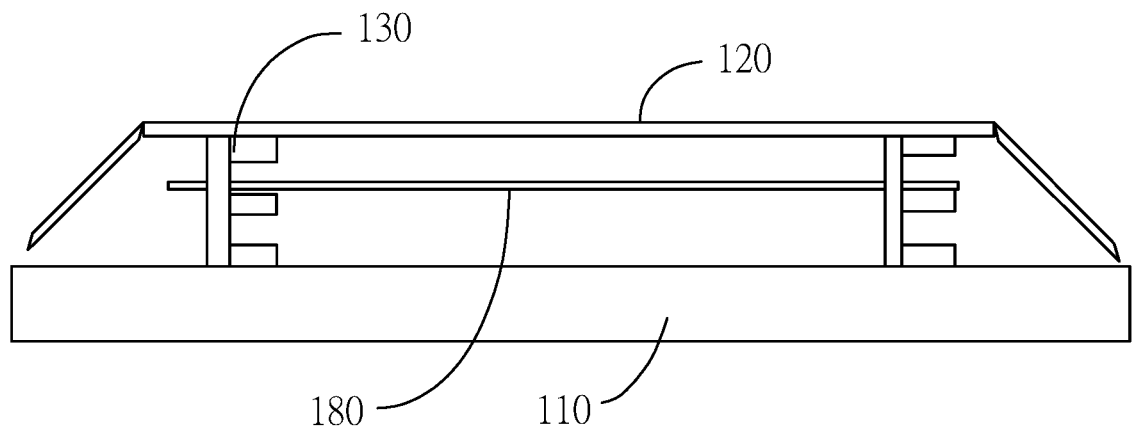
FIG. 5 is a schematic diagram of a third battery box provided by an exemplary embodiment of the disclosure.
Figure 6:
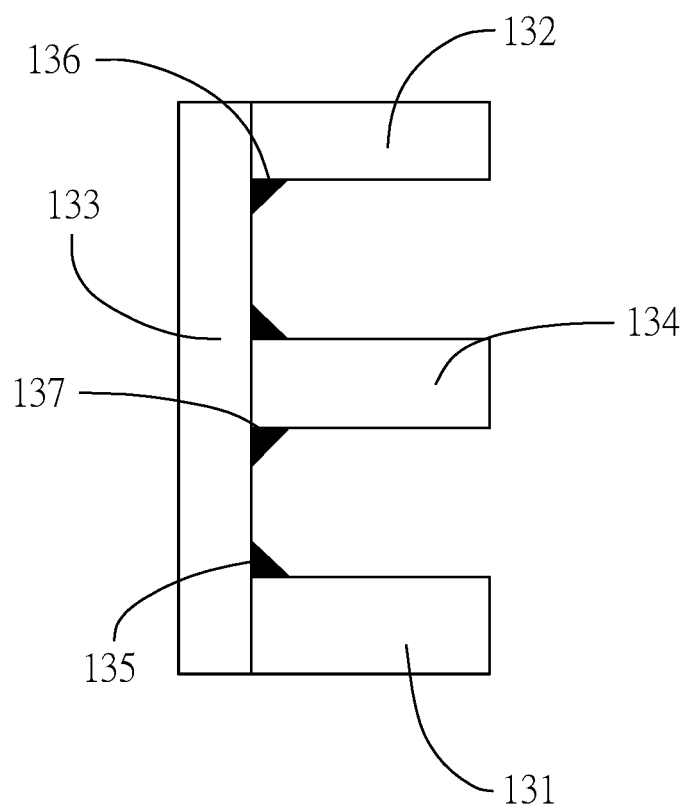
FIG. 6 is a schematic diagram of another buffer member provided by an exemplary embodiment of the disclosure.

In another feasible embodiment of the disclosure, as shown in FIG. 5 and FIG. 6, the buffer members 130 include: the first connecting portion 131, the second connecting portion 132, the third connecting portion 134, and the buffer portion 133. The first connecting portion 131 is configured to be connected to the beam 110; the second connecting portion 132 is configured to be connected to the box cover 120; an end of the buffer portion 133 is connected to the first connecting portion 131, and another end of the buffer portion 133 is connected to the second connecting portion 132. The third connecting portion 134 and the buffer portion 133 are connected, and the third connecting portion 134 is located between the first connecting portion 131 and the second connecting portion 132.

On this basis, the battery box further includes a cooling member 180 (for example, a cold plate), the cooling member 180 is disposed between the beam 110 and the box cover 120, and the cooling member 180 is connected to the third connecting portion 134. The cooling member 180 is restricted by the third connecting portion 134 to avoid vibration of the cooling member 180.

Of course, in practical applications, the battery box may also include a connecting wire harness, a conductive bar, a connector, etc., and the connecting wire harness, the conductive bar, or the connector may be connected to the third connecting portion 134, and the embodiments of the disclosure are not limited thereto.

A surface of the first connecting portion 131 close to the beam 110 may be a flat surface, and the flat surface is in contact with the top surface of the beam 110. The first connecting portion 131 and the beam 110 may be connected by a connecting method such as welding, bolting, riveting, or gluing. A surface of the second connecting portion 132 close to the box cover 120 may be a flat surface, and the flat surface is in contact with the top surface of the beam 110. The first connecting portion 131 and the beam 110 may be connected by a connecting method such as welding, bolting, riveting, or gluing. A surface of the third connecting portion 134 close to the box cover 120 may be a flat surface, and the flat surface is in contact with the bottom surface of the cooling member 180. The third connecting portion 134 and the box cover 120 may be connected by a connecting method such as welding, bolting, riveting, or gluing.

An end of the buffer portion 133 is connected to the first connecting portion 131, and another end of the buffer portion 133 is connected to the second connecting portion 132. The buffer portion 133 is configured to provide a buffer when the box cover 120 is vibrated, so as to avoid excessive vibration of the box cover 120. For example, the buffer portion 133 may have elasticity. When the force applied to the buffer members 130 by the box cover 120 is greater than a preset threshold, the buffer portion 133 may be elastically deformed, so as to buffer the vibration of the box cover 120. The third connecting portion 134 and the buffer portion 133 are connected, the third connecting portion 134 is located between the first connecting portion 131 and the second connecting portion 132, and the third connecting portion 134 is configured to be connected to the cooling member 180.

The first connecting portion 131, the second connecting portion 132, the third connecting portion 134, and the buffer portion 133 in the buffer members 130 may be an integrated structure. For example, the first connecting portion 131, the second connecting portion 132, the third connecting portion 134, and the buffer portion 133 in the buffer members 130 may be integrally formed by casting or machining. Alternatively, the first connecting portion 131, the second connecting portion 132, the third connecting portion 134, and the buffer portion 133 in the buffer members 130 may be separate structures. For example, the buffer portion 133 and the first connecting portion 131, the second connecting portion 132, and the third connecting portion 134 may be connected by welding, respectively, or the buffer portion 133 and the first connecting portion 131, the second connecting portion 132, and the third connecting portion 134 may be connected by riveting, respectively, or the buffer portion 133 and the first connecting portion 131, the second connecting portion 132, and the third connecting portion 134 may be connected by a bolt, respectively. Of course, in practical applications, the buffer portion 133 and the first connecting portion 131, the second connecting portion 132, and the third connecting portion 134 may also be connected in other ways, and the embodiments of the disclosure are not limited thereto.

For example, the second connecting portion 132 and the buffer portion 133 may be separate structures. A through hole is disposed on the cooling member 180, and the buffer portion 133 penetrates the through hole. The second connecting portion 132 and the buffer portion 133 are separate structures. During mounting, the buffer portion 133 may be inserted through a through hole on the cold plate, and then the second connecting portion 132 and the buffer portion 133 may be connected to facilitate the mounting of the cooling member 180. The size of the through hole on the cold plate is smaller than the size of the third connecting portion 134, so that the third connecting portion 134 may support the cold plate.

The materials of the first connecting portion 131, the second connecting portion 132, the third connecting portion 134, and the buffer portion 133 may be the same. For example, the materials of the first connecting portion 131, the second connecting portion 132, the third connecting portion 134, and the buffer portion 133 may be stainless steel, aluminum alloy, etc. When the materials of the first connecting portion 131, the second connecting portion 132, the third connecting portion 134, and the buffer portion 133 are the same, and the first connecting portion 131, the second connecting portion 132, the third connecting portion 134, and the buffer portion 133 are a flat plate structure, the thickness of the first connecting portion 131 is greater than the thickness of the buffer portion 133, the thickness of the second connecting portion 132 is greater than the thickness of the buffer portion 133, and the thickness of the third connecting portion 134 is greater than the thickness of the buffer portion 133. The large thickness of the first connecting portion 131, the second connecting portion 132, and the third connecting portion 134 may ensure the connection strength of the buffer members 130 and the beam 110 and the buffer portion 133 and the box cover 120. The small thickness of the buffer portion 133 may ensure that the stiffness of the buffer portion 133 is within the preset required range, so that the buffer portion 133 may be elastically deformed when the box is vibrated.

Alternatively, the materials of the first connecting portion 131, the second connecting portion 132, the third connecting portion 134, and the buffer portion 133 are different, and the stiffness of the first connecting portion 131, the second connecting portion 132, and the third connecting portion 134 is greater than the stiffness of the buffer portion 133. The large stiffness of the first connecting portion 131, the second connecting portion 132, and the third connecting portion 134 may ensure the stability of the connection of the beam 110 and the buffer members 130 and the buffer members 130 and the box cover 120, and the small stiffness of the buffer portion 133 may ensure that the stiffness of the buffer portion 133 is within the preset required range, so that the buffer portion 133 may be elastically deformed when the box is vibrated. On this basis, when the first connecting portion 131, the second connecting portion 132, the third connecting portion 134, and the buffer portion 133 have a flat plate structure, the thicknesses of the first connecting portion 131, the second connecting portion 132, the third connecting portion 134, and the buffer portion 133 may be the same. The first connecting portion 131, the second connecting portion 132, the third connecting portion 134, and the buffer portion 133 have the same thickness to facilitate manufacture.

The extending direction of the first connecting portion 131 is perpendicular to the extending direction of the buffer portion 133, and the extending direction of the second connecting portion 132 and the third connecting portion 134 is consistent with the extending direction of the first connecting portion 131. That is, the first connecting portion 131, the second connecting portion 132, the third connecting portion 134, and the buffer portion 133 are E-shaped.

It should be mentioned that, in an embodiment of the disclosure, the extending direction of the third connecting portion 134 is consistent with the extending direction of the first connecting portion 131, meaning that the first connecting portion 131 and the third connecting portion 134 are located at a side of the buffer portion 133, and the first connecting portion 131 and the third connecting portion 134 are disposed in parallel. The parallel arrangement of the first connecting portion 131 and the third connecting portion 134 means that the extending direction of the first connecting portion 131 and the extending direction of the third connecting portion 134 are parallel within the tolerance range of the process. The acute angle between the extending direction of the first connecting portion 131 and the extending direction of the third connecting portion 134 is smaller than a preset threshold. For example, the acute angle between the extending direction of the first connecting portion 131 and the extending direction of the third connecting portion 134 is less than 3 degrees, 2 degrees, 1 degree, etc.

In an embodiment of the disclosure, the buffer members 130 further include the first reinforcement portion 135, the second reinforcement portion 136, and a third reinforcement portion 137. The first reinforcement portion 135 is connected to the first connecting portion 131 and the buffer portion 133, respectively; the second reinforcement portion 136 is connected to the second connecting portion 132 and the buffer portion 133, respectively; and the third reinforcement portion 137 is connected to the buffer portion 133 and the third connecting portion 134, respectively. The first reinforcement portion 135 is configured to improve the connection strength of the first connecting portion 131 and the buffer portion 133, the second reinforcement portion 136 is configured to improve the connection strength of the first connecting portion 131 and the buffer portion 133, and the second reinforcement portion 136 is configured to improve the connection strength of the first connecting portion 131 and the buffer portion 133.

In particular, the first reinforcement portion 135 may be a first reinforcement rib, and the first reinforcement rib is disposed at a portion where the first connecting portion 131 and the buffer portion 133 are connected. The second reinforcement portion 136 may be a second reinforcement rib, and the second reinforcement rib is disposed at a portion where the second connecting portion 132 and the buffer portion 133 are connected. The third reinforcement portion 137 may be a third reinforcement rib, and the third reinforcement rib is disposed at a portion where the third connecting portion 134 and the buffer portion 133 are connected.

Figure 7:
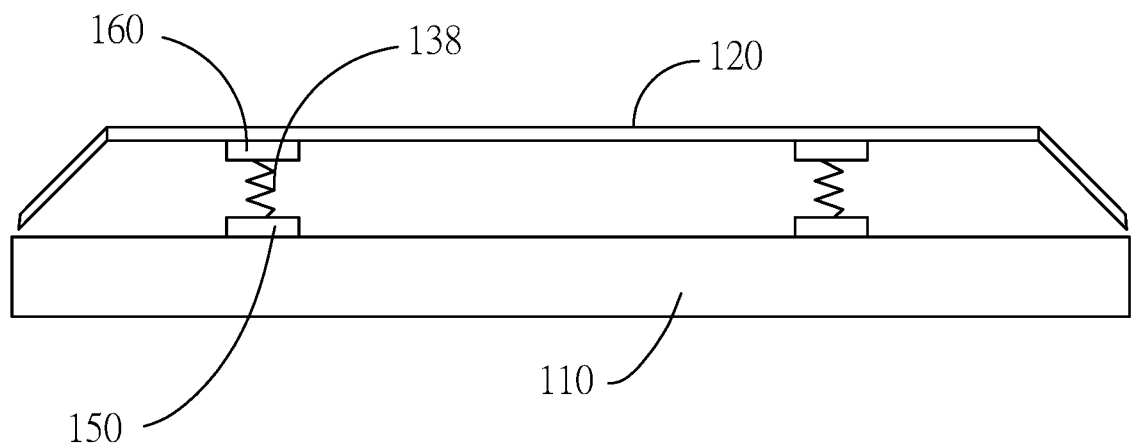
FIG. 7 is a schematic diagram of a fourth battery box provided by an exemplary embodiment of the disclosure.

In another feasible embodiment of the disclosure, as shown in FIG. 7, the buffer members 130 may include a spring 138, an end of the spring 138 is connected to the beam 110, and another end of the spring 138 is connected to the box cover 120 assembly. In particular, the first end of the spring 138 is connected to a side of the beam 110 close to the box cover 120, and the second end of the spring 138 is connected to a side of the box cover 120 close to the beam 110.

In order to connect the spring 138 to the beam 110 and the box cover 120, the battery box provided by an embodiment of the disclosure may further include: a first connecting member 150 and a second connecting member 160, wherein the first connecting member 150 is connected to the beam 110 and the spring 138; and the second connecting member 160 is connected to the box cover 120 and the spring 138. For example, the first connecting member 150 may be a first connecting seat, and the first connecting seat is connected to the beam 110 by one or a plurality of methods of bolting, welding, riveting, and gluing. A first mounting portion is disposed on the first connecting seat, and the first end of the spring 138 is connected to the first mounting portion. The second connecting member 160 may be a second connecting seat, and the second connecting seat is connected to the box cover 120 by one or a plurality of methods of bolting, welding, riveting, and gluing. A second mounting portion is disposed on the first connecting seat, and the second end of the spring 138 is connected to the second mounting portion.

In the battery box provided by an embodiment of the disclosure, the box cover 120 is disposed at a side of the beam 110 away from the bottom plate, and the buffer members 130 are respectively connected to the beam 110 and the box cover 120. The beam 110 and the box cover 120 are connected via the buffer members 130 to buffer the vibration of the box cover 120, thereby solving the issue that excessive vibration of the box cover 120 damages the box cover 120, so as to improve the service life of the box cover 120. Potential damage to the batteries is also avoided when the box cover 120 is vibrated, thus improving the service life of the batteries.

Moreover, in an embodiment of the disclosure, the batteries are directly placed in the battery compartments, and there is no need to package a plurality of batteries into battery modules and mount them in the battery compartments. Therefore, the number of batteries in the battery compartments may be increased, thereby increasing the energy density of the battery pack. Since the batteries are directly mounted at the battery compartments, the box cover 120 may indirectly be in contact with the batteries during the vibration process, causing the batteries to be damaged. The box cover 120 and the beam 110 are connected by the buffer members 130, thus preventing the box cover 120 from damaging the batteries during vibration, and at the same time preventing the box cover 120 from being damaged. Further, the vibration of the box cover 120 may drive the box to vibrate, thus facilitating the mixing of electrolytes in the batteries, thereby facilitating the reaction of the batteries.

Exemplary embodiments of the disclosure also provide a battery pack. The battery pack includes the above battery box and battery assemblies, and the battery assemblies are disposed in the battery box.

The battery box includes a bottom plate, the beam 110, and the box cover 120. The buffer members 130 are disposed between the beam 110 and the box cover 120 and connected to the beam 110 and the box cover 120.

Further, the battery box may further include the frame 140. The frame 140 is disposed at the bottom plate, the frame 140 and the beam 110 form a plurality of battery compartments on the bottom plate, and each of the battery compartments is provided with one battery assembly. The battery assemblies include at least two batteries, and the at least two batteries are sequentially arranged at the battery compartments.

In particular, a connecting adhesive layer may be disposed between adjacent batteries in the at least two batteries, and a plurality of batteries may be bonded by the connecting adhesive layer.

The battery pack provided by an embodiment of the disclosure includes a battery box. In the battery box, the box cover 120 is disposed at a side of the beam 110 away from the bottom plate, and the buffer members 130 are respectively connected to the beam 110 and the box cover 120. The beam 110 and the box cover 120 are connected via the buffer members 130 to buffer the vibration of the box cover 120, thereby solving the issue that excessive vibration of the box cover 120 damages the box cover 120, so as to improve the service life of the box cover 120. Potential damage to the batteries is also avoided when the box cover 120 is vibrated, thus improving the service life of the batteries.

An embodiment of the disclosure also provides a vehicle. The vehicle may be an electric vehicle. The vehicle includes the above battery pack, and the electric vehicle is provided with energy via the battery pack.

The battery pack includes a battery box and battery assemblies, and the battery assemblies are disposed in the battery box. The battery box includes a bottom plate, the beam 110, the frame 140, and the box cover 120. The buffer members 130 are disposed between the beam 110 and the box cover 120, and are connected to the beam 110 and the box cover 120. The frame 140 is disposed at the bottom plate, the frame 140 and the beam 110 form a plurality of battery compartments on the bottom plate, and each of the battery compartments is provided with one battery assembly.

A vehicle provided by an embodiment of the disclosure includes a battery box. In the battery box, the box cover 120 is disposed at a side of the beam 110 away from the bottom plate, and the buffer members 130 are connected to the beam 110. The buffer members 130 between the beam 110 and the box cover 120 may buffer the vibration of the box cover 120 to improve safety, and solve the issue that excessive vibration of the box cover 120 damages the box cover 120, so as to improve the service life of the box cover 120. Potential damage to the batteries from the box cover 120 during vibration is also avoided, thus improving the service life of the batteries.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery box, wherein the battery box comprises:
   a beam;
   a box cover; and
   a buffer member, wherein the buffer member is disposed between the beam and the box cover and connected to the beam,
   wherein the buffer member comprises:
   a first connecting portion, wherein the first connecting portion is configured to connect the beam;
   a second connecting portion, wherein the second connecting portion is configured to connect the box cover; and
   a buffer portion, wherein an end of the buffer portion is connected to the first connecting portion, another end of the buffer portion is connected to the second connecting portion, a thickness of the first connecting portion is greater than a thickness of the buffer portion, and a thickness of the second connecting portion is greater than the thickness of the buffer portion.

2. The battery box of claim 1, wherein a first end of the buffer member is connected to a side of the beam close to the box cover.

3. The battery box of claim 2, wherein a second end of the buffer member is connected to a side of the box cover close to the beam.

4. The battery box of claim 1, wherein an extending direction of the first connecting portion is perpendicular to an extending direction of the buffer portion, and an extending direction of the second connecting portion is parallel to the extending direction of the first connecting portion.

5. The battery box of claim 4, wherein the buffer member is C-shaped.

6. The battery box of claim 1, wherein the buffer member further comprises:
   a third connecting portion, wherein the third connecting portion is connected to the buffer portion, and the third connecting portion is located between the first connecting portion and the second connecting portion.

7. The battery box of claim 6, wherein an extending direction of the first connecting portion is perpendicular to an extending direction of the buffer portion, an extending direction of the second connecting portion is consistent with the extending direction of the first connecting portion, and an extending direction of the third connecting portion is consistent with the extending direction of the first connecting portion to form an E-shaped buffer member.

8. The battery box of claim 6, wherein the battery box further comprises:

a cooling member, wherein the cooling member is disposed between the beam and the box cover, and the cooling member is connected to the third connecting portion.

9. The battery box of claim 1, wherein the buffer member further comprises:
   a first reinforcement portion, wherein the first reinforcement portion is respectively connected to the first connecting portion and the buffer portion; and
   a second reinforcement portion, wherein the second reinforcement portion is respectively connected to the second connecting portion and the buffer portion.

10. The battery box of claim 4, wherein the buffer member further comprises:
    a first reinforcement portion, wherein the first reinforcement portion is respectively connected to the first connecting portion and the buffer portion; and
    a second reinforcement portion, wherein the second reinforcement portion is respectively connected to the second connecting portion and the buffer portion.

11. The battery box of claim 5, wherein the buffer member further comprises:
    a first reinforcement portion, wherein the first reinforcement portion is respectively connected to the first connecting portion and the buffer portion; and
    a second reinforcement portion, wherein the second reinforcement portion is respectively connected to the second connecting portion and the buffer portion.

12. The battery box of claim 6, wherein the buffer member further comprises:
    a first reinforcement portion, wherein the first reinforcement portion is respectively connected to the first connecting portion and the buffer portion; and
    a second reinforcement portion, wherein the second reinforcement portion is respectively connected to the second connecting portion and the buffer portion.

13. The battery box of claim 7, wherein the buffer member further comprises:
    a first reinforcement portion, wherein the first reinforcement portion is respectively connected to the first connecting portion and the buffer portion; and
    a second reinforcement portion, wherein the second reinforcement portion is respectively connected to the second connecting portion and the buffer portion.

14. The battery box of claim 8, wherein the buffer member further comprises:
    a first reinforcement portion, wherein the first reinforcement portion is respectively connected to the first connecting portion and the buffer portion; and
    a second reinforcement portion, wherein the second reinforcement portion is respectively connected to the second connecting portion and the buffer portion.

15. The battery box of claim 1, wherein the buffer member comprises:
    a spring, wherein an end of the spring is connected to the beam, and another end of the spring is connected to the box cover.

16. The battery box of claim 15, wherein the battery box further comprises:
    a first connecting member, wherein the first connecting member is connected to the beam and the spring; and
    a second connecting member, wherein the second connecting member is connected to the box cover and the spring.

17. The battery box of claim 1, wherein the battery box further comprises:
    a frame, wherein the frame and the beam form a plurality of battery compartments, and the battery compartments are configured for accommodating batteries, and when the batteries are disposed in the battery compartments, the frame and/or the beam are connected to the batteries to withstand at least a portion of a weight of the batteries.

18. A battery pack, wherein the battery pack comprises:
    the battery box of claim 1; and
    a battery assembly, wherein the battery assembly is disposed in the battery box.

19. A vehicle, wherein the vehicle comprises the battery pack of claim 18.

* * * * *